(12) United States Patent
Posselt et al.

(10) Patent No.: US 11,898,702 B2
(45) Date of Patent: Feb. 13, 2024

(54) TRANSPORT CONTAINER AND METHOD

(71) Applicant: Linde GmbH, Pullach (DE)

(72) Inventors: Heinz Posselt, Pullach (DE); Jürgen Bichlmeier, Pullach (DE)

(73) Assignee: Linde GmbM, Pullach (DE)

( * ) Notice: Subject to any disclaimer, the term of this patent is extended or adjusted under 35 U.S.C. 154(b) by 147 days.

(21) Appl. No.: 17/310,950

(22) PCT Filed: Feb. 28, 2020

(86) PCT No.: PCT/EP2020/025101
§ 371 (c)(1),
(2) Date: Sep. 1, 2021

(87) PCT Pub. No.: WO2020/177924
PCT Pub. Date: Sep. 10, 2020

(65) Prior Publication Data
US 2022/0082211 A1 Mar. 17, 2022

(30) Foreign Application Priority Data
Mar. 6, 2019 (EP) .................................... 19020105

(51) Int. Cl.
F17C 1/12 (2006.01)
F17C 13/00 (2006.01)

(52) U.S. Cl.
CPC .... *F17C 13/001* (2013.01); *F17C 2201/0109* (2013.01); *F17C 2201/035* (2013.01); *F17C 2201/054* (2013.01); *F17C 2203/032* (2013.01); *F17C 2203/0312* (2013.01); *F17C 2203/0366* (2013.01); *F17C 2203/0391* (2013.01); *F17C 2203/0607* (2013.01); *F17C 2203/0629* (2013.01); *F17C 2203/0643* (2013.01);
(Continued)

(58) Field of Classification Search
CPC ................... F17C 2203/0312; F17C 2203/032
See application file for complete search history.

(56) References Cited

U.S. PATENT DOCUMENTS 2,863,297 A 12/1958 Johnston
3,947,348 A * 3/1976 Schabernack ............. H01P 3/13
205/73

(Continued)

FOREIGN PATENT DOCUMENTS

EP 3361137 A1 8/2018
WO 2017190846 A1 11/2017
(Continued)

*Primary Examiner* — Stephen J Castellano
(74) *Attorney, Agent, or Firm* — Millen, White, Zelano & Branigan, P.C.; Brion P. Heaney

(57) ABSTRACT

The invention relates to a transport container for helium, comprising an inner container for receiving the helium, an insulation element that is provided on the exterior of the inner container, a coolant container for receiving a cryogenic liquid, an outer container in which the inner container and the coolant container are received, and a thermal shield which can be actively cooled with the aid of the cryogenic liquid and in which the inner container is received, wherein a peripheral gap is provided between the insulation element and the thermal shield, and said insulation element comprises an electrodeposited copper layer that faces the thermal shield.

18 Claims, 5 Drawing Sheets

(52) U.S. Cl.
CPC ............ *F17C 2203/0646* (2013.01); *F17C 2209/232* (2013.01); *F17C 2221/017* (2013.01); *F17C 2223/033* (2013.01); *F17C 2223/035* (2013.01); *F17C 2227/0341* (2013.01); *F17C 2227/0376* (2013.01); *F17C 2260/033* (2013.01)

(56) References Cited

U.S. PATENT DOCUMENTS

| | | | | |
|---|---|---|---|---|
| 2002/0155232 | A1* | 10/2002 | DeLay | B32B 25/14 |
| | | | | 428/34.1 |
| 2004/0163842 | A1* | 8/2004 | Okada | C23C 28/3455 |
| | | | | 174/254 |
| 2012/0237789 | A1* | 9/2012 | Wang | C23C 18/31 |
| | | | | 428/458 |
| 2018/0231182 | A1* | 8/2018 | Posselt | F17C 3/04 |

FOREIGN PATENT DOCUMENTS

| | | | |
|---|---|---|---|
| WO | 2017190848 A1 | 11/2017 | |
| WO | 2017190849 A1 | 11/2017 | |

\* cited by examiner

TRANSPORT CONTAINER AND METHOD

This application is the national stage of international application No. PCT/EP2020/025101 filed 28 Feb. 2020.

The invention relates to a transport container for helium and to a method for producing such a transport container.

Helium is extracted together with natural gas. For economic reasons, transporting large quantities of helium is practical only in liquid or supercritical form, i.e., at a temperature of approximately 4.2 to 10 K and at a pressure of 1 to 13 bar. In order to transport the liquid or supercritical helium, transport containers are used which are thermally insulated in a complex process so as to prevent an excessively rapid increase in the pressure of the helium. Such transport containers are coolable—for example, with the aid of liquid nitrogen. In this case, a thermal shield cooled with the liquid nitrogen is provided. The thermal shield shields an inner container of the transport container. The liquid or cryogenic helium is accommodated in the inner container. The holding time for the liquid or cryogenic helium in such transport containers is approximately 45 days, which means that, after this time, the pressure in the inner container will have increased to the maximum value of 13 bar. The thermal insulation of the transport container consists of high-vacuum multilayer insulation.

WO 2017/190848 A1 describes such a transport container for liquid helium. This transport container comprises an inner container for receiving the helium, an insulation element that is provided on the exterior of the inner container, a coolant container for receiving a cryogenic liquid, an outer container in which the inner container and the coolant container are received, and a thermal shield which can be actively cooled with the aid of the cryogenic liquid and in which the inner container is received. In this case, a peripheral gap is provided between the insulation element and the thermal shield, and the insulation element has a copper coating facing the thermal shield. The copper coating is here in the form of a rolled copper foil.

Against this background, the aim of the present invention is to provide an improved transport container.

Accordingly, a transport container for helium is proposed. The transport container comprises an inner container for receiving the helium, an insulation element that is provided on the exterior of the inner container, a coolant container for receiving a cryogenic fluid, an outer container in which the inner container and the coolant container are received, and a thermal shield, which can be actively cooled with the aid of the cryogenic fluid and in which the inner container is received, wherein a peripheral gap is provided between the insulation element and the thermal shield, and wherein the insulation element has an electrodeposited copper coating facing the thermal shield.

Since the peripheral gap is provided between the insulation element and the thermal shield, the insulation element has no mechanical contact with the thermal shield. As a result, heat can be transferred from the surfaces of the inner container to the thermal shield only by radiation and residual gas conduction. Providing the thermal shield also ensures that the inner container is surrounded only by surfaces which have a temperature corresponding to the boiling point of the cryogenic fluid (boiling point of nitrogen at 1.3 bara: 79.5 K). As a result, there is only a small temperature difference between the thermal shield (79.5 K) and the inner container (temperature of the helium at 1 bara to 13 bara: 4.2 to 10 K), in comparison with the surroundings of the outer container.

By using an electrodeposited copper coating instead of a rolled copper foil, it has now been found that the total heat incidence of ca. 6 W (rolled copper foil) can be reduced to 3.5 W (electrodeposited copper coating). The holding time for the liquid helium can thereby be significantly extended from 45 days to 85 days, in comparison with the transport container mentioned in the introduction. This simplifies transport, allows longer transport distances, and reduces transport costs.

The inner container can also be referred to as a helium container or inner tank. The transport container can also be referred to as a helium transport container. The helium can be referred to as liquid or cryogenic helium. The helium is, in particular, likewise a cryogenic fluid. The transport container is in particular designed to transport the helium in a cryogenic or liquid form, or in supercritical form. In thermodynamics, the critical point is a thermodynamic state of a substance which is characterized by an equalization of the densities of the liquid phase and the gas phase. The differences between the two states of matter cease to exist at this point. In a phase diagram, the point represents the upper end of the vapor pressure curve. The helium is introduced into the inner container in liquid or cryogenic form. A liquid zone with liquid helium and a gas zone with gaseous helium then form in the inner container. After being introduced into the inner container, the helium thus has two phases with different states of matter, viz., liquid and gaseous. This means that a phase boundary between the liquid helium and the gaseous helium is present in the inner container. After a certain time, i.e., when the pressure in the inner container rises, the helium in the inner container becomes single-phase. The phase boundary then no longer exists, and the helium is supercritical.

The cryogenic fluid or the cryogen is preferably liquid nitrogen. The cryogenic fluid can also be referred to as coolant. The cryogenic fluid may, alternatively, also be, for example, liquid hydrogen or liquid oxygen. The thermal shield being "actively coolable" or "actively cooled" is to be understood in particular as the cryogenic fluid flowing at least partially through or around the thermal shield in order to cool it. For this purpose, the thermal shield can comprise a cooling line or several cooling lines in which the cryogenic fluid is accommodated. The cryogenic fluid boils in the process. The gaseous phase and the liquid phase of the cryogenic fluid are thus present. The cryogenic fluid can therefore be accommodated in the cooling line both in its gaseous phase and in its liquid phase. In contrast to "active cooling," in the case of "passive cooling," the thermal shield is primarily cooled only by heat conduction. A cryogenic fluid can also be used for passive cooling. In this case, however, said fluid does not flow around or through the thermal shield, but the thermal shield is, for example, partially in contact with the cryogenic fluid. Regions of the thermal shield which are not directly in contact with the cryogenic fluid are cooled by thermal conduction.

In particular, the thermal shield is actively cooled only in one operating state, i.e., when the inner container is filled with helium. When the cryogenic fluid is consumed, the thermal shield can also be uncooled. When the thermal shield is actively cooled, the cryogenic fluid may boil and evaporate. The thermal shield thus has a temperature that approximately or exactly corresponds to the boiling point of the cryogenic fluid.

The thermal shield is, in particular, arranged inside the outer container. The coolant container is, in particular, placed outside the thermal shield. The inner container is preferably arranged outside the coolant container. Conversely, the coolant container is also positioned outside the inner container, wherein both the coolant container and the inner container are arranged inside the outer container. The coolant container is particularly preferably positioned next to and at a distance from the inner container.

On the outside, the inner container and, in particular, the insulation element, preferably has a temperature that corresponds approximately or exactly to the temperature of the helium. The thermal shield can have a tubular base section and a cover section which closes off the base section at the front face and is arranged between the inner container and the coolant container. The cover section preferably completely closes off the base section at the front face. The base section of the thermal shield may have a circular or approximately circular cross-section. The outer container, the inner container, the coolant container, and the thermal shield can have a rotationally-symmetrical design with respect to a common axis of symmetry or center axis. The inner container and the outer container are preferably made of stainless steel. The inner container preferably has a tubular base section which is closed on both sides with curved cover sections. The inner container is fluid-tight. The outer container preferably also has a tubular base section which is closed at the front face on both sides by cover sections. The base section of the inner container and/or the base section of the outer container can have a circular or approximately circular cross-section.

An intermediate space between the inner container and the outer container is preferably evacuated. In order to be able to discharge the helium contained in the inner container via safety valves provided thereon in the event of a collapse of the vacuum, the inner container is surrounded by the insulation element, which also reduces the incidence of heat in the event of non-vacuum. As a result, the insulation element has the function of emergency insulation in the event of a vacuum collapse.

The insulation element is preferably multilayer. The insulation element can also be referred to as a multilayer insulation element. The insulation element being "multilayer" means, in particular, that the insulation element has several coatings or layers arranged one above the other, e.g., alternating coatings of aluminum foil and glass paper, wherein an outermost coating or layer is the electrodeposited copper coating. "Outermost" layer or coating here means a coating of the insulation element furthest away from the inner container. In this case, the outermost coating is closest to the thermal shield and also faces it. An intermediate space in which the insulation element is arranged is provided between the inner container and the thermal shield. This intermediate space is filled with the insulation element up to the peripheral gap. For example, the insulation element is wound onto the inner container.

The copper coating being "electrodeposited" is to be understood in particular as meaning that the copper coating is deposited from a copper solution—in particular, from a solution containing copper ions—onto a carrier, e.g., onto a metal drum. In contrast to a rolled copper foil, the copper coating is thus constructed from the copper solution at an atomic level. The copper coating has a bare metal surface. That is, the copper coating is not surface-coated or oxidized. Since the emissivity of the copper coating decreases with decreasing temperature, the heat transfer due to radiation also decreases, so that the total heat incidence onto the inner container can be reduced to approximately 3.5 W over the entire helium holding time.

The copper coating preferably has a thickness of at least 5 µm—particularly preferably of at least 10 µm, preferably of less than 20 µm, and particularly preferably in the range of 10 to 20 µm. The copper coating preferably has a mass fraction of copper of at least 99% copper, and particularly preferably of at least 99.9% copper. The copper coating preferably has a surface free of impurities, such as fats or oils.

According to one embodiment, the peripheral gap has a gap width of 5 to 15 mm—preferably of 10 mm.

The gap being peripheral is to be understood as meaning that the gap runs completely around the inner container. In particular, the gap is also provided on the cover sections of the inner container.

According to a further embodiment, the peripheral gap is evacuated.

This ensures that heat can be transferred from the inner container to the thermal shield only by radiation and residual gas conduction.

According to a further embodiment, the copper coating has a wall thickness of 10 µm to 20 µm.

The wall thickness can also be referred to as thickness. Copper can be spared due to the small wall thickness. This reduces production costs. However, the copper coating can also be less than 10 µm or more than 20 µm thick.

According to a further embodiment, the insulation element is fastened to the exterior of the inner container.

For example, the insulation element can be wound onto the inner container. The insulation element can be fixedly connected, e.g., glued, to the inner container.

According to a further embodiment, the insulation element has a multilayer insulation arranged between the inner container and the copper coating.

The insulation can be a so-called MLI (multilayer insulation). The copper coating is preferably an additional layer of a smooth copper foil made of high-purity, bare copper, which is applied to the MLI tightly and without folds.

According to a further embodiment, the multilayer insulation has several, alternately-arranged, layers of aluminum foil and glass paper.

The layers of aluminum foil are used as a reflector and as a mechanical attachment for the layers of glass paper, which ensure the thermal insulation in the event of vacuum collapse. The aluminum foil can be perforated and embossed.

According to a further embodiment, the layers of aluminum foil and glass paper are applied without gaps to the inner container.

"Without gaps" is to be understood in particular as meaning that the layers of aluminum foil lie flat against the layers of glass paper. When the multilayer insulation is applied to the inner container, care is taken to ensure the highest possible mechanical pressing of the layers of aluminum foil and glass paper in order to make all the layers as isothermal as possible. An isothermal state change is a thermodynamic state change in which the temperature remains unchanged.

According to a further embodiment, the copper coating is a copper foil.

In particular, the copper coating is a foil of high-purity, bare copper, which is applied to the multilayer insulation tightly and without folds. A "foil" is to be understood here as meaning a thin-walled, flat component which is flexibly deformable due to its small wall thickness, viz., the aforementioned 10 µm to 20 µm.

According to a further embodiment, the copper coating has, for production-related reasons, a surface facing away from the bath and facing the thermal shield, and a surface facing the bath and facing away from the thermal shield.

As previously mentioned, the copper coating is deposited onto a carrier which is immersed in a bath filled with the copper solution. The carrier can be a cylindrical drum or roller. The surface or side facing away from the bath bears against the carrier and can also be referred to as the surface or side facing the carrier, or the surface or side facing the drum. Depending upon the surface quality of the carrier, which can be highly polished, for example, a very low roughness results for the surface facing away from the bath in comparison with the side facing the bath. The surface or side facing the bath does not bear against the carrier and can also be referred to as the surface or side facing away from the carrier, or the surface or side facing away from the drum. The surface facing away from the bath can also be referred to as the smooth surface and the surface facing the bath can also be referred to as the rough surface of the copper coating. The higher roughness of the surface facing the bath results from the electrolytic deposition process.

According to a further embodiment, the transport container further comprises a multilayer insulation arranged between the thermal shield and the outer container.

The insulation is preferably likewise an MLI. The insulation preferably completely fills an intermediate space provided between the thermal shield and the outer container so that the insulation is in contact with both the thermal shield and the outer container.

According to a further embodiment, the multilayer insulation has several, alternately-arranged, layers of aluminum foil and glass silk, glass mesh fabric, or glass paper.

The layers of glass paper, glass silk, or glass mesh fabric act as spacers between the layers of aluminum foil, which act as a reflector. The aluminum foil is preferably perforated and embossed. As a result, the insulation arranged between the thermal shield and the outer container can be evacuated without any problem. An undesired mechanical-thermal contact between the aluminum foil layers is also reduced. This contact could interfere with the temperature gradient, established by radiation exchange, of the aluminum foil layers.

According to a further embodiment, the layers of aluminum foil and glass silk, glass mesh fabric, or glass paper are applied with gaps to the thermal shield.

"With gaps" is to be understood in particular as meaning that intermediate spaces that can be evacuated are in each case provided between the layers of aluminum foil and the layers of glass silk, glass mesh fabric, or glass paper. In contrast to the insulation element of the inner container, the layers of aluminum foil and glass silk, glass mesh fabric, or glass paper of the insulation are preferably introduced in a fluffy manner into the intermediate space provided between the thermal shield and the outer container. Here, "fluffy" means that the layers of aluminum foil and glass paper are not compressed, with the result that, due to the embossing and perforation of the aluminum foil, the insulation and thus the intermediate space can be evacuated without any problem.

According to a further embodiment, the outer container is evacuated.

Very good thermal insulation is thereby ensured, since heat transfer is possible only through radiation and residual gas conduction.

According to a further embodiment, the thermal shield completely encloses the inner container.

The thermal shield is preferably made of an aluminum material. In particular, the thermal shield is made of a high-purity aluminum material. This results in particularly good heat-transport and heat-reflection properties. The thermal shield completely enclosing the inner container ensures that the inner container is completely surrounded by surfaces having a temperature corresponding to the boiling temperature of the cryogenic fluid.

According to a further embodiment, the thermal shield has a base section and two cover sections, which close off the base section at the front face on both sides.

The two cover sections are preferably curved. In particular, the cover sections are provided on the base section in such a way that they are curved away from the base section. One of the cover sections is preferably arranged between the coolant container and the inner container. This ensures that, even if the liquid level in the coolant container decreases, the inner container is surrounded only by surfaces that have a temperature corresponding to the boiling point of the cryogenic fluid.

According to a further embodiment, the thermal shield is fluid-permeable.

This means that the thermal shield is permeable to liquids and gases. For this purpose, the thermal shield can have, for example, apertures, holes, or bores. Due to the fluid permeability, the intermediate space provided between the inner container and the thermal shield can be evacuated.

According to a further embodiment, a center axis of the transport container is oriented to be parallel to a horizontal.

The horizontal is oriented, in particular, to be perpendicular to a direction of gravity. The transport container is designed to be substantially rotationally symmetrical with respect to the central axis. This means that, when the transport container is being transported, it is transported "lying down."

Furthermore, a method for producing a transport container for helium as explained above is proposed. The method comprises the following steps: a) providing an inner container for receiving the helium, b) producing an electrodeposited copper coating, and c) applying an insulation element to the exterior of the inner container, wherein the insulation element has the copper coating as the outermost layer with respect to the inner container.

The method can further comprise the following steps: Providing and/or producing a coolant container for receiving a cryogenic fluid. Providing and/or producing an outer container in which the inner container and the coolant container are received. Providing and/or producing a thermal shield which can be actively cooled with the aid of the cryogenic fluid and in which the inner container is received. In this case, a peripheral gap is provided between the insulation element and the thermal shield. In step c), the insulation element is applied to the inner container in such a way that the electrodeposited copper coating faces the thermal shield.

According to one embodiment, in step b), the copper coating is electrodeposited from a copper solution onto a carrier surface.

In particular, the copper coating is deposited directly onto the carrier surface. An additional carrier foil is not necessary. The copper solution used to deposit the copper coating can be a sulphuric acid, high-purity copper solution.

According to a further embodiment, the carrier surface is cylindrical—in particular, circular cylindrical.

The carrier surface can be a cylindrical outer surface of a drum or roller. However, the carrier surface can also have any other desired geometry.

According to a further embodiment, in step c), the copper coating is arranged such that a surface, facing away from the bath, of the copper coating is arranged facing away from the inner container, and a surface, facing the bath, of the copper coating is arranged facing the inner container.

As mentioned above, the surface facing away from the bath has a lower roughness than the surface facing the bath.

The embodiments and features described for the transport container apply correspondingly to the proposed method, and vice versa.

In the present case, "an" is not necessarily to be understood as limiting to exactly one element. Rather, several elements, such as two, three, or more, may also be provided. Any other numerical word used herein is also not to be understood as meaning that an exact limitation to exactly the corresponding number of elements must be realized. Rather, differences in number upwards and downwards are possible.

Further possible implementations of the transport container and/or of the method also include not explicitly mentioned combinations of features or embodiments described above or below with respect to the exemplary embodiments. A person skilled in the art will also add individual aspects as improvements or additions to the respective basic form of the transport container and/or of the method.

Further advantageous embodiments of the transport container and/or of the method form the subject matter of the dependent claims and of the exemplary embodiments described below of the transport container and/or of the method. The transport container and/or the method are explained below in more detail on the basis of preferred embodiments, with reference to the accompanying figures.

In the figures, the same or functionally equivalent elements have been provided with the same reference symbols unless otherwise stated.

Figure 1:
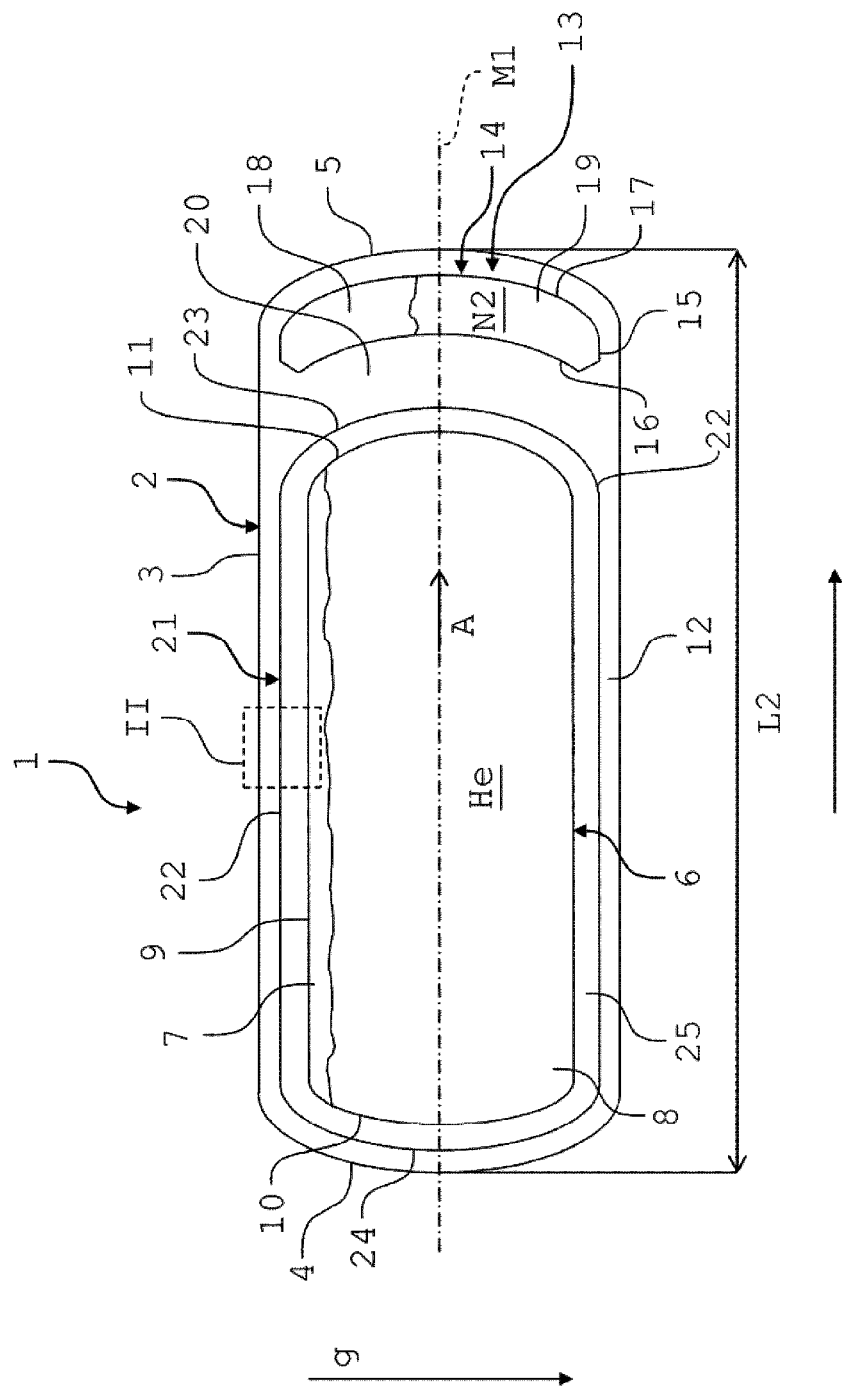
FIG. 1 shows a schematic sectional view of an embodiment of a transport container.
Figure 2:
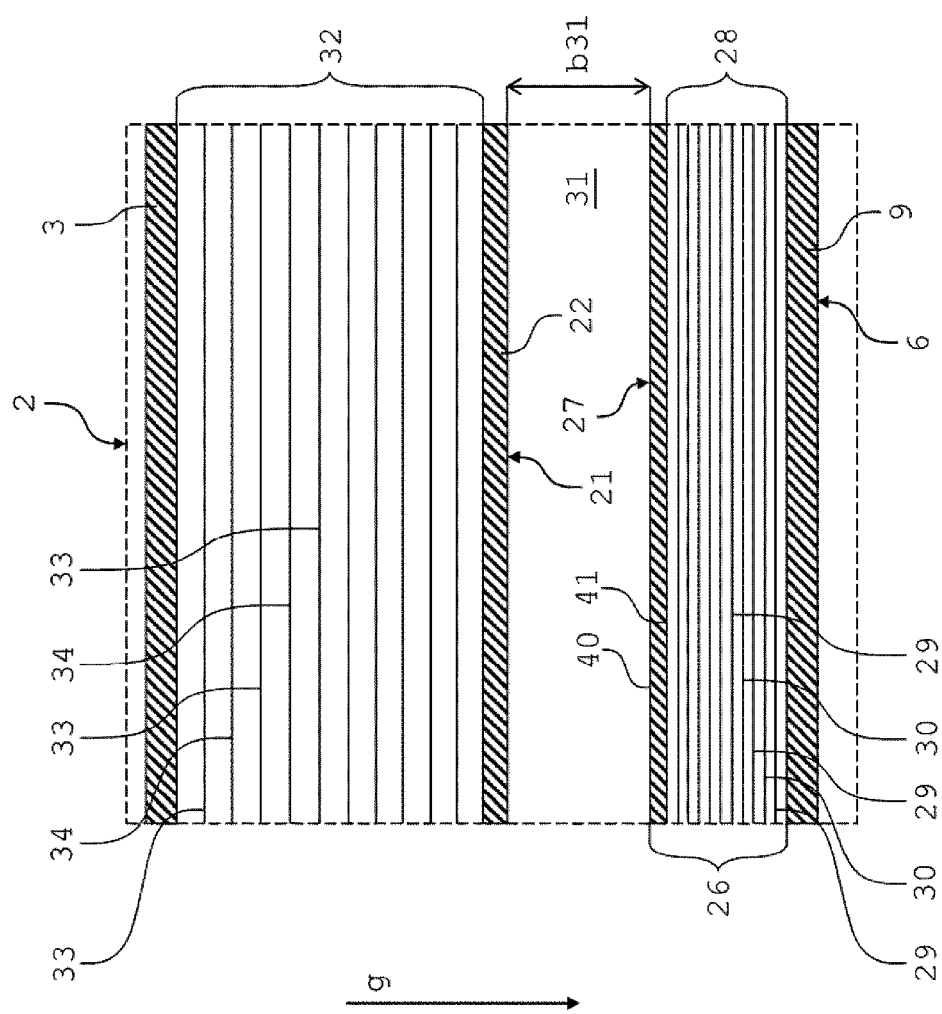
FIG. 2 shows the detailed view II according to FIG. 1.

FIG. 1 shows a highly simplified schematic sectional view of an embodiment of a transport container 1 for liquid helium He. FIG. 2 shows the detailed view II according to FIG. 1. In the following, reference is made simultaneously to FIGS. 1 and 2.

The transport container 1 can also be referred to as a helium transport container. The transport container 1 can also be used for other cryogenic liquids. Examples of cryogenic fluids or liquids, or cryogens for short, are the aforementioned liquid helium He (boiling point at 1 bara: 4.222 K=−268.928° C.), liquid hydrogen H2 (boiling point at 1 bara: 20.268 K=−252.882° C.), liquid nitrogen N2 (boiling point at 1 bara: 77.35 K=−195.80° C.), or liquid oxygen O2 (boiling point at 1 bara: 90.18 K=−182.97° C.).

The transport container 1 comprises an outer container 2. The outer container 2 can be made of stainless steel, for example. The outer container 2 can have a length L2 of 10 m, for example. The outer container 2 comprises a tubular or cylindrical base section 3, which is closed at the front face on both sides in each case by means of a cover section 4, 5—in particular, with the aid of a first cover section 4 and a second cover section 5. The cross-section of the base section 3 can have a circular or approximately circular geometry. The cover sections 4, 5 are curved. The cover sections 4, 5 are curved in opposite directions, so that the two cover sections 4, 5 are curved outwards with respect to the base section 3. The outer container 2 is fluid-tight—in particular, gas-tight. The outer container 2 has an axis of symmetry or center axis M1, relative to which the outer container 2 is rotationally symmetrical in design.

The transport container 1 further comprises an inner container 6 for holding the liquid helium He. The inner container 6 is likewise made of stainless steel, for example. As long as the helium He is in the two-phase region, a gas zone 7 with evaporated helium He and a liquid zone 8 with liquid helium He can be provided in the inner container 6. The inner container 6 is fluid-tight—in particular, gas-tight—and may include a blow-off valve for controlled pressure reduction. Like the outer container 2, the inner container 6 comprises a tubular or cylindrical base section 9 which is closed at the front face on both sides by cover sections 10, 11—in particular, a first cover section 10 and a second cover section 11. The base section 9 in cross-section can have a circular or approximately circular geometry.

The inner container 6, like the outer container 2, is rotationally symmetrical with respect to the center axis M1. An intermediate space 12, provided between the inner container 6 and the outer container 2, is evacuated. The transport container 1 furthermore comprises a cooling system 13 with a coolant container 14. A cryogenic fluid, such as liquid nitrogen N2, is accommodated in the coolant container 14. The coolant container 14 comprises a tubular or cylindrical base section 15, which can be designed to be rotationally symmetrical with respect to the center axis M1. The cross-section of the base section 15 can have a circular or approximately circular geometry. The base section 15 is closed at the front face in each case by a cover section 16, 17. The cover sections 16, 17 can be curved. In particular, the cover sections 16, 17 are curved in the same direction. The coolant container 14 can also have a different design.

A gas zone 18 with evaporated nitrogen N2 and a liquid zone 19 with liquid nitrogen N2 can be provided in the coolant container 14. In an axial direction A of the inner container 6, the coolant container 14 is arranged next to the inner container 6. An intermediate space 20, which can be part of the intermediate space 12, is provided between the inner container 6—in particular, the cover section 11 of the inner container—and the coolant container 14—in particular, the cover section 16 of the coolant container 14. This means that the intermediate space 20 is also evacuated.

The transport container 1 furthermore comprises a thermal shield 21 assigned to the cooling system 13. The thermal shield 21 is arranged in the evacuated intermediate space 12 provided between the inner container 6 and the outer container 2. The thermal shield 21 is actively coolable or actively cooled with the aid of the liquid nitrogen N2. "Active cooling" is to be understood in the present case to mean that the liquid nitrogen N2 is passed through or guided along the thermal shield 21 for cooling it. In this case, the thermal shield 21 is cooled to a temperature which corresponds approximately to the boiling point of the nitrogen N2.

The thermal shield 21 comprises a cylindrical or tubular base section 22, which is closed off on both sides by a cover section 23, 24 that closes this off at the front face. Both the base section 22 and the cover sections 23, 24 are actively cooled by means of the nitrogen N2. The cross-section of the base section 22 can have a circular or approximately circular geometry. The thermal shield 21 is preferably likewise designed to be rotationally symmetrical with respect to the center axis M1.

A first cover section 23 of the thermal shield 21 is arranged between the inner container 6—in particular, the cover section 11 of the inner container 6—and the coolant container 14—in particular, the cover section 16 of the coolant container 14. A second cover section 24 of the thermal shield 21 faces away from the coolant container 14. The thermal shield 21 is self-supporting. That is, the thermal shield 21 is supported neither on the inner container 6 nor on the outer container 2. For this purpose, a support ring can be provided on the thermal shield 21, said support ring being suspended from the outer container 2 via support rods—in particular, pull rods. Furthermore, the inner container 6 can be suspended from the support ring via further support rods. Heat transfer through the mechanical support rods is partially realized by the support ring. The support ring has pockets that allow a greatest possible thermal length of the supporting rods. The coolant container 14 has feedthroughs for the mechanical support rods.

The thermal shield 21 is fluid-permeable. This means that an intermediate space 25 between the inner container 6 and the thermal shield 21 is fluidically connected to the intermediate space 12. The intermediate spaces 12, 25 can thus be evacuated at the same time. Bores, apertures, or the like can be provided in the thermal shield 21 to allow an evacuation of the intermediate spaces 12, 25. The thermal shield 21 is preferably made of a high-purity aluminum material.

The first cover section 23 of the thermal shield 21 shields the coolant container 14 completely from the inner container 6. That is, looking from the inner container 6 towards the coolant container 14, the coolant container 14 is completely covered by the first cover section 23 of the thermal shield 21. In particular, the thermal shield 21 completely encloses the inner container 6. That is to say, the inner container 6 is arranged completely within the thermal shield 21, wherein the thermal shield 21, as already mentioned, is not fluid-tight.

For actively cooling the thermal shield 21, it comprises at least one, but preferably several, cooling lines. For example, the thermal shield 21 can have six cooling lines. The cooling line or cooling lines are fluidically connected to the coolant container 14 so that the liquid nitrogen N2 can flow from the coolant container 14 into the cooling line or into the cooling lines. The cooling system 13 can furthermore comprise a phase separator, not shown in FIG. 1, configured to separate gaseous nitrogen N2 from liquid nitrogen N2. The gaseous nitrogen N2 can be blown off from the cooling system 13 via the phase separator.

The cooling line or the cooling lines are provided not only on the base section 22, but also on the cover sections 23, 24 of the thermal shield 21. The cooling line or the cooling lines have a slope with respect to a horizontal H, which is arranged in a manner perpendicular to a direction of gravity g. In particular, the cooling line or the cooling lines form an angle with the horizontal H of more than 3°.

The inner container 6 also comprises an insulation element 26, which is shown in FIG. 2 in cutout. The insulation element 26 is multilayer. That is to say, the insulation element 26 comprises a plurality of layers or coatings. The insulation element 26 can therefore also be referred to as a multilayer insulation element. The insulation element 26 completely encloses the inner container 6. That is, the insulation element 26 is provided not only on the base section 9, but also on the cover sections 10, 11 of the inner container 6. The insulation element 26 is provided between the inner container 6 and the thermal shield 21. That is to say, the insulation element 26 is arranged in the intermediate space 25. The insulation element 26 has a highly-reflective copper coating 27 on the outside, i.e., facing the thermal shield 21. The copper coating 27 is bare metal. That is, the copper coating 27 has no surface coating or oxide coating.

The actual thermal insulation of the inner container 6 to the temperature level of the liquid nitrogen N2 of the thermal shield 21 takes place by means of the copper coating 27. The copper coating 27 is preferably a smooth foil of high-purity, bare copper, which is wrapped tightly and without folds around a multilayer insulation 28 arranged between the copper coating 27 and the inner container 6. The insulation 28 comprises several, alternately-arranged, layers or coatings of perforated and embossed aluminum foil 29 as a reflector and glass paper 30 as a spacer between the aluminum foils, and as insulation if the vacuum between the aluminum foils 29 collapses. The insulation 28 may be 10-layered. The layers of aluminum foil 29 and glass paper 30 are applied, i.e., pressed, without gaps to the inner container 6. The insulation coating 28 can be a so-called MLI. The inner container 6 and also the insulation element 26 have, on the outside, a temperature approximately corresponding to the boiling point of the helium He. During the assembly of the insulation 28, care is taken that the layers of aluminum foil 29 and glass paper 30 have as great a mechanical compression as possible, in order to ensure that all the layers of the insulation 28 are as isothermal as possible.

A gap 31 completely surrounding the inner container 6 is provided between the insulation element 26 and the thermal shield 21. The gap 31 is also provided between the insulation element 26 and the cover sections 23, 24 of the thermal shield 21. The gap 31 has a gap width b31. The gap width b31 is preferably 5 mm to 15 mm, but is preferably 10 mm. The gap 31 is evacuated. In particular, the gap 31 is part of the intermediate space 25. The intermediate space 25 is filled with the insulation element 26 up to the gap 31.

A further multilayer insulation 32—in particular, likewise an MLI—which completely fills the intermediate space 12 and thus is in contact with the thermal shield 21 on the outside and the outer container 2 on the inside, can be arranged between the thermal shield 21 and the outer container 2. The insulation 32 is provided both between the respective base sections 3, 22 and between the cover section 24 of the thermal shield 21 and the cover section 4 of the outer container 2, and between the cover section 23 of the thermal shield 21 and the coolant container 14. The insulation 32 likewise comprises alternately-arranged layers or coatings of aluminum foil 33 and glass silk, or glass mesh fabric glass paper 34, which, however, are introduced into the intermediate space 12 in a fluffy manner, deviating from the previously described insulation element 26 of the inner container 6. Here, "fluffy" means that the layers of aluminum foil 33 and glass paper 34 are not compressed, with the result that, due to the embossing and perforation of the aluminum foil 33, the insulation 32 and thus the intermediate space 12 can be evacuated without any problem.

Figure 3:
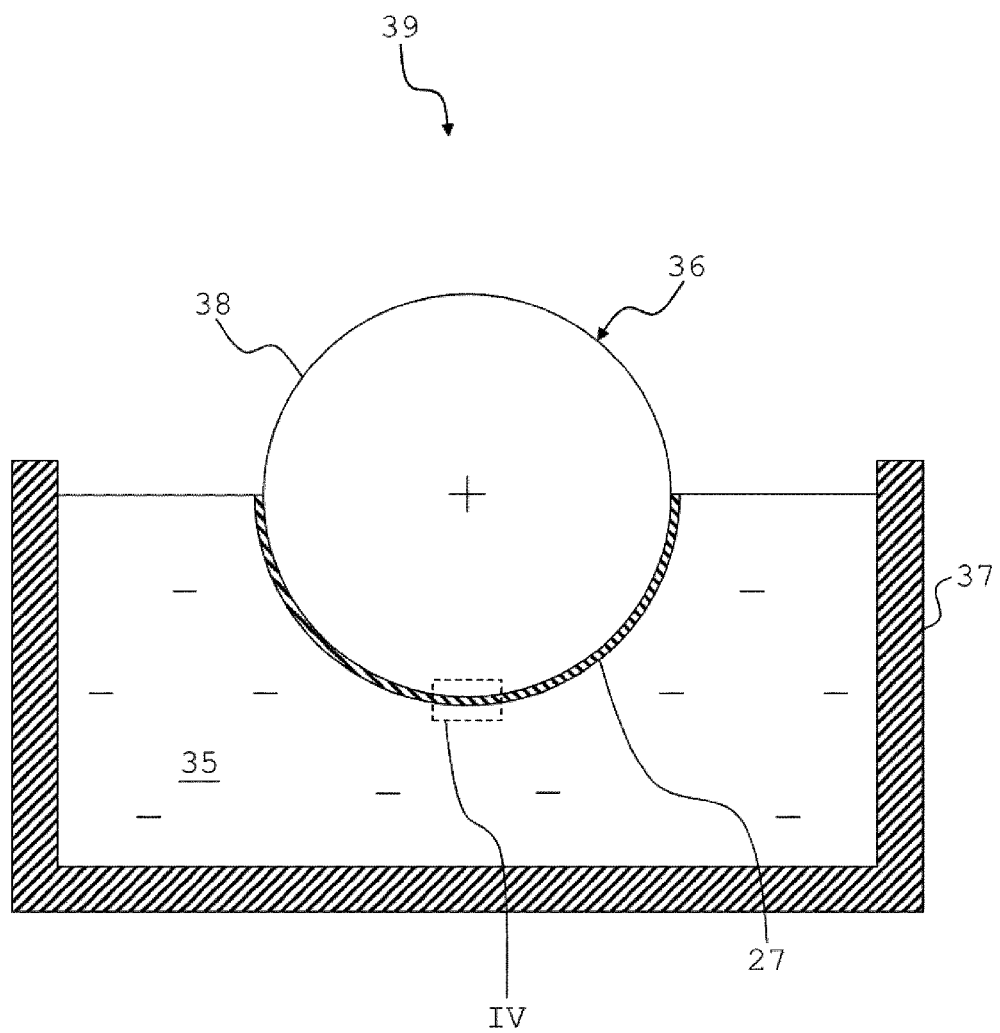
FIG. 3 shows a schematic sectional view of a production device for producing a copper coating for the transport container according to FIG. 1.

As shown in FIG. 3, the copper coating 27 is a coating electrodeposited from a copper solution 35. The copper coating 27 can also be referred to as an ED copper coating (electrodeposited copper coating). The copper coating 27 is of high purity. Preferably, the copper coating 27 has a mass fraction of at least 99% copper, and preferably of at least 99.9% copper. The copper solution 35 can be a sulphuric acid, high-purity copper solution.

To produce the copper coating 27, a roller or drum 36 is immersed up to its halfway point in a bath 37 filled with the copper solution 35. The drum 36 can also be referred to as a carrier. Copper is electrodeposited from the copper solution 35 onto a cylindrical outer surface or carrier surface 38 of the drum 36. Of course, the copper is deposited only onto the area of the carrier surface 38 which is immersed in the copper solution 35. The copper coating 27 is deposited directly onto the drum 36. An additional carrier foil is not necessary. The bath 37 and the drum 36 are part of a production device 39 for producing the copper coating 27. The production device 39 can also comprise, for example, a lifting and lowering device, with the aid of which the drum 36 can be lifted out of the bath 37 and lowered into it again.

Figure 4:
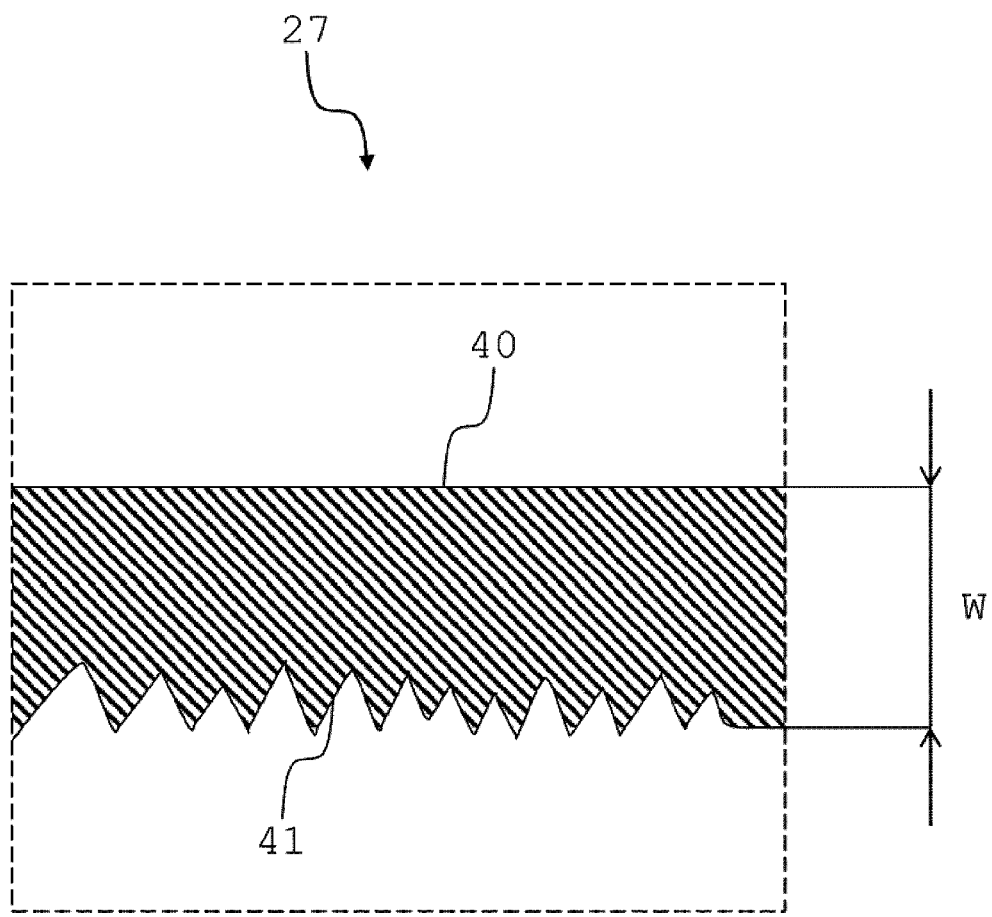
FIG. 4 shows the detailed view IV according to FIG. 3.

Due to the low adhesion of the deposited copper coating 27 to the oxidized carrier surface 38, it can easily be peeled off or lifted off the drum 36. The copper coating 27 can thus be produced continuously. As shown in FIG. 4, due to the electrodeposition process, there is a smooth side or surface 40 facing away from the bath and a rough side or surface 41 facing the bath. The surface 40 facing away from the bath can also be referred to as the side facing the drum. The surface 41 facing the bath can also be referred to as the side or surface facing away from the drum. A wall thickness W of the copper coating is 10 to 20 µm.

During the production of the transport container 1, the copper coating 27 is arranged such that the smooth surface 40 facing away from the bath faces the thermal shield 21. That is, the gap 31 is defined by the surface 40 facing away from the bath and the thermal shield 21. By contrast, the rough surface 41 facing the bath faces the layers of aluminum foil 29 and glass paper 30 of the insulation 28. Thus, only the smooth surface 40 facing away from the bath is involved in the relevant radiation exchange.

With the aid of the gap 31, the thermal shield 21 is arranged peripherally and spaced apart from the copper coating 27 of the insulation element 26 of the inner container 6, and does not touch it. Heat incidence from radiation is thereby reduced to the physically possible minimum. Heat from the surfaces of the inner container 6—in particular, from the surface 40, facing away from the bath, of the copper coating 27—is transferred to the thermal shield 21 only by radiation and residual gas conduction.

The operating principle of the transport container 1 will be explained below. Before the inner container 6 is filled with the liquid helium He, the thermal shield 21 is first at least approximately or completely cooled down to the boiling point of liquid nitrogen N2 (1.3 bara, 79.5 K) with the aid of cryogenic, initially gaseous and later liquid, nitrogen N2. The inner container 6 is not yet actively cooled. When the thermal shield 21 cools, the vacuum residual gas still in the intermediate space 12 is frozen out at the thermal shield 21. As a result, when the inner container 6 is filled with the liquid helium He, the vacuum residual gas can be prevented from freezing out on the outside of the inner container 6 and thus contaminating the bare metal surface of the copper coating 27 of the insulation element 26 of the inner container 6. Once the thermal shield 21 and the coolant container 14 have completely cooled down and the coolant container 14 has been filled again, the inner container 6 is filled with the liquid helium He.

The transport container 1 can now be moved onto a transport vehicle, such as a truck or a ship, for transporting the liquid helium He. The thermal shield 21 is continuously cooled by means of the liquid nitrogen N2. In the process, the liquid nitrogen N2 is consumed and boils in the cooling lines of the cooling system 13. Gas bubbles which are formed in the process are fed through the phase separator arranged highest in the cooling system 13 with respect to the direction of gravity g. With the aid of the phase separator, the gaseous nitrogen N2 in the cooling system 13 can be blown off, as a result of which the liquid nitrogen N2 can flow out of the coolant container 14.

Since the copper coating 27 is not in mechanical contact with the thermal shield 21 due to the gap 31, heat can be transferred from the surfaces of the inner container 6 to the thermal shield 21 only through radiation and residual gas conduction. Since the copper coating 27 is applied tightly to the insulation 28, it has good mechanical contact with the insulation 28, and the copper coating 27 also has a temperature close to the temperature of the helium He. Since the emissivity of the copper coating 27 decreases with decreasing temperature, the heat transfer due to radiation also decreases, so that the total heat incidence onto the inner container 6 can be reduced to less than 3.5 W over the holding time of the helium He. The emissivity of a body indicates how much radiation it emits in comparison with an ideal heat radiator—a black body.

The inner container 6 being completely surrounded by the thermal shield 21 ensures that the inner container 6 is surrounded only by surfaces that have a temperature corresponding to the boiling point (1.3 bara, 78.5 K) of nitrogen N2. As a result, there is only a small temperature difference between the thermal shield 21 (78.5 K) and the inner container (4.2-6 K). As a result, the holding time for the liquid helium He can be significantly extended in comparison with known transport containers. The insulation element 26 has the function of emergency insulation for the inner container 6 in the event of vacuum collapse.

Figure 5:
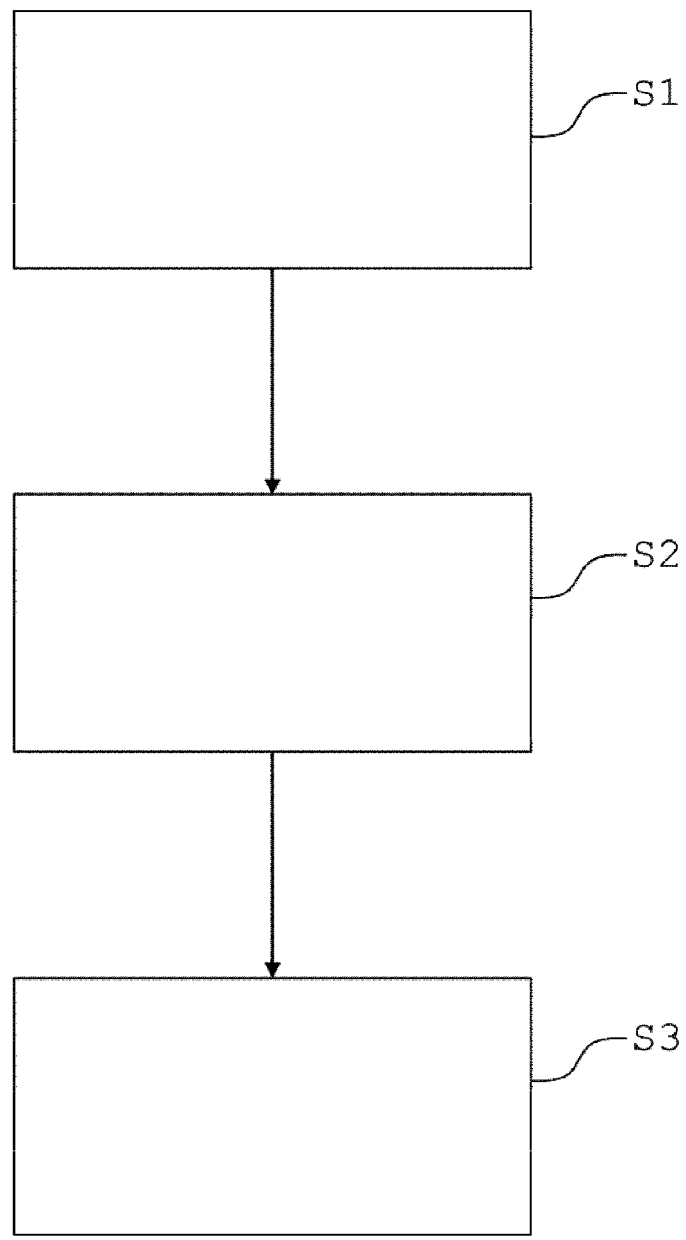
FIG. 5 shows a schematic block diagram of an embodiment of a method for producing a transport container according to FIG. 1.

FIG. 5 shows a schematic block diagram of a method for producing a transport container 1 as previously explained. The method comprises the following steps: In a step S1, the inner container 6 is provided. Step S1 can comprise producing the inner container 6. In a step S2, the electrodeposited copper coating 27 is produced, as previously explained. In a step S3, the insulation element 26 is applied to the exterior of the inner container 6, wherein the insulation element 26 has the copper coating 27 as the outermost layer with respect to the inner container 6. "Exterior" here means facing the thermal shield 21.

The method can further comprise the following steps: Providing and/or producing the coolant container 14. Providing and/or producing the outer container 2 in which the inner container 6 and the coolant container 14 are received. Providing and/or producing the thermal shield 21 in which the inner container 6 is received. In this case, the peripheral gap 31 is provided between the insulation element 26 and the thermal shield 21. In step S3, the insulation element 26 is applied to the inner container 6 in such a way that the copper coating 27 faces the thermal shield 21. Furthermore, in step S3, the copper coating 27 is arranged such that the surface 40 facing away from the bath is arranged facing away from the inner container 6, and the surface 41 facing the bath is arranged facing the inner container 6.

Although the present invention has been described with reference to exemplary embodiments, it can be modified in many ways.

REFERENCE SYMBOLS USED

1 Transport container
2 Outer container
3 Base section
4 Cover section
5 Cover section
6 Inner container
7 Gas zone 8 Liquid zone
9 Base section
10 Cover section
11 Cover section
12 Intermediate space
13 Cooling system
14 Coolant container
15 Base section
16 Cover section
17 Cover section
18 Gas zone
19 Liquid zone
20 Intermediate space
21 Shield
22 Base section
23 Cover section
24 Cover section
25 Intermediate space
26 Insulation element
27 Copper coating
28 Insulation coating
29 Aluminum foil
30 Glass paper
31 Gap
32 Insulation coating
33 Aluminum foil
34 Glass paper
35 Copper solution
36 Drum
37 Bath
38 Carrier surface
39 Production device
40 Surface
41 Surface
A Axial direction
b31 Gap width
g Direction of gravity
H Horizontal
He Helium
$H_2$ Hydrogen
L2 Length
M1 Center axis
N2 Nitrogen
O2 Oxygen
S1 Step
S2 Step
S3 Step
W Wall thickness

The invention claimed is:

1. A transport container for helium, comprising;
an inner container for receiving the helium,
an insulation element that is provided on the exterior of the inner container,
a coolant container for receiving a cryogenic fluid,
an outer container in which the inner container and the coolant container are received, and
a thermal shield, which can be actively cooled with the aid of the cryogenic fluid and in which the inner container is received,
wherein a peripheral gap is provided between the insulation element and the thermal shield,
wherein the insulation element has an electrodeposited copper foil facing the thermal shield, and
wherein the copper foil has a relatively smooth surface facing the thermal shield and a relatively rough surface facing away from the thermal shield.

2. The transport container according to claim 1, wherein the copper foil has a wall thickness of 10 μm to 20 μm.

3. The transport container according to claim 1, wherein the insulation element is fastened to the exterior of the inner container.

4. The transport container according to claim 1, wherein the insulation element further comprises a multilayer insulation arranged between the inner container and the copper foil.

5. The transport-container according to claim 4, wherein the multilayer insulation has a plurality of, alternately-arranged, layers of aluminum foil- and glass paper.

6. The transport container according to claim 5, wherein the layers of aluminum foil and glass paper are applied without gaps to the inner container.

7. The transport container according to claim 1, further comprising a multilayer insulation arranged between the thermal shield and the outer container.

8. The transport container according to claim 7, wherein the multilayer insulation has a plurality of, alternately-arranged, layers of (a) aluminum foil and (b) glass silk, glass mesh fabric, or glass paper.

9. The transport-container according to claim 8, wherein the layers of (a) aluminum foil and (b) glass silk, glass mesh fabric, or glass paper are applied with gaps to the thermal shield.

10. The transport container according to claim 1, wherein a center axis of the transport container is horizontally oriented.

11. The transport container according to claim 1, wherein the copper foil has a wall thickness of 5 μm to 20 μm.

12. The transport container according to claim 1, wherein the peripheral gap provided between the insulation element and the thermal shield has a gap width of 5 to 15 mm.

13. The transport container according to claim 1, wherein the thermal shield is fluid-permeable.

14. A method for producing a transport container for helium, comprising:
a) providing an inner container for receiving the helium,
b) producing an electrodeposited copper foil, wherein the electrodeposited copper foil is electrodeposited from a copper solution onto a carrier surface and the electrodeposited copper foil is removed from the carrier surface,
c) applying an insulation element to the exterior of the inner container, wherein the insulation element includes said electrodeposited copper foil as the outermost layer with respect to the inner container,
d) providing a thermal shield in which the inner container and the insulation element are received, wherein a peripheral gap is provided between the insulation element and the thermal shield, and
e) providing an outer container in which the inner container, the insulation element, and the thermal shield are received.

15. The method according to claim 14, wherein the carrier surface is cylindrical.

16. The method according to claim 14, wherein, in c), the electrodeposited copper foil has a relatively smooth surface and a relatively rough surface, and the copper foil is arranged such that the relatively rough surface faces the inner container, and the relatively smooth surface of the electrodeposited copper foil faces away from the inner container.

17. The method according to claim 14, wherein the insulation element further comprises a multilayer insulation arranged between the inner container and the electrodeposited copper foil.

18. The method according to claim 17, wherein the multilayer insulation has a plurality of, alternately-arranged, layers of aluminum foil- and glass paper.

* * * * *